United States Patent [19]

Hess et al.

[11] 4,102,749

[45] * Jul. 25, 1978

[54] PROCESS FOR MAKING OIL FROM AQUEOUS REACTIVE SLUDGES AND SLURRIES

[75] Inventors: Howard V. Hess, Glenham; William F. Franz, Gardiner; Edward L. Cole, Fishkill, all of N.Y.

[73] Assignee: Texaco Inc., New York, N.Y.

[*] Notice: The portion of the term of this patent subsequent to Jun. 21, 1994, has been disclaimed.

[21] Appl. No.: 789,380

[22] Filed: Apr. 21, 1977

Related U.S. Application Data

[62] Division of Ser. No. 532,967, Dec. 16, 1974, Pat. No. 4,030,981.

[51] Int. Cl.² .............. C10B 53/02; C10B 57/04; C10B 57/06; C10G 1/00
[52] U.S. Cl. .............................. 201/2.5; 201/4; 201/25; 201/36; 201/44; 208/8
[58] Field of Search .............. 201/2.5, 4, 25, 36, 201/44; 208/8; 110/18 R; 48/209; 252/373

[56] References Cited

U.S. PATENT DOCUMENTS

| | | | |
|---|---|---|---|
| 2,676,908 | 4/1954 | Noel | 201/2.5 X |
| 3,558,426 | 1/1971 | Hess et al. | 201/2.5 X |
| 3,668,077 | 6/1972 | Ban | 201/44 X |
| 3,733,255 | 5/1973 | Appell et al. | 201/2.5 X |
| 3,864,254 | 2/1975 | Hess et al. | 201/2.5 X |
| 3,899,398 | 8/1975 | Cole et al. | 201/2.5 X |
| 4,030,981 | 6/1977 | Hess et al. | 201/2.5 |

*Primary Examiner*—Morris O. Wolk
*Assistant Examiner*—Michael S. Marcus
*Attorney, Agent, or Firm*—Thomas H. Whaley; Carl G. Ries; Henry W. Archer

[57] ABSTRACT

A process for making low sulfur oil by reacting aqueous reactive sludges and slurries with hot, pressurized carbon monoxide and hydrogen (synthesis gas) wherein the wastes are first concentrated by coking in the liquid phase under a pressure of 300 to 3000 psig at a temperature of 400° to 550° F for from 5 minutes to 2 hours.

3 Claims, 1 Drawing Figure

U.S. Patent    July 25, 1978    4,102,749
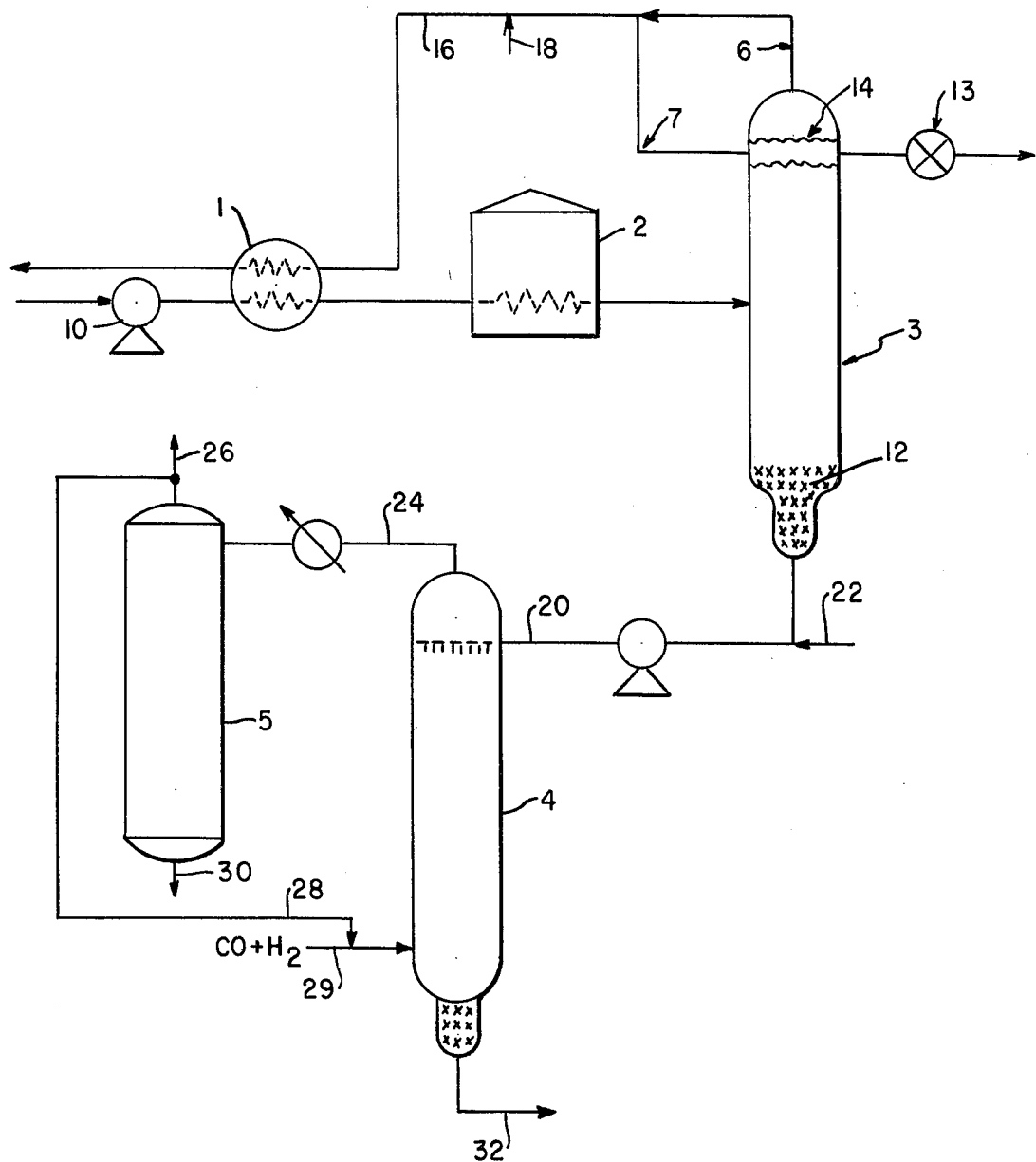

PROCESS FOR MAKING OIL FROM AQUEOUS REACTIVE SLUDGES AND SLURRIES

CROSS REFERENCE TO COPENDING APPLICATION

This application is a division of co-pending, coassigned application Ser. No. 532,967 filed Dec. 16, 1974, now U.S. Pat. No. 4,030,981 issued Jun. 21, 1977.

BACKGROUND OF THE INVENTION

This invention is concerned with a process for making low sulfur oil from sewage sludge.

The Bureau of Mines Report PB 203,669, entitled "Converting Organic Wastes to Oil", describes the reaction of carbon monoxide and water with various biological wastes containing cellulose, and other carbohydrates. These wastes include wood wastes (largely cellulose and liquid), sewage sludge and other urban wastes (mostly cellulose and other carbohydrates plus proteins and fats), and agricultural wastes such as cow manure. They have found that by reaction of these materials with CO and water a low sulfur oil can be produced.

One difficulty with this process as applied to sewage is that the sludge is so dilute that the reactor employed for the reaction of the CO and water with the sludge must be very large.

SUMMARY OF THE INVENTION

To eliminate the above-outlined problem, the present invention provides a method and means for concentrating reacting solids by coking at a temperature of 400° to 550° F in the liquid phase under a pressure of 300 to 1200 psig for 5 minutes to 2 hours to produce a concentrate which is then fed to a CO-water reactor. The solids are concentrated by removing 50 to 99 percent of the liquids comprising the sludge and treated with carbon monoxide at a pressure of 500 to 5000 psig and a temperature of 500° to 750° F to form gases, solids and oil.

BRIEF DESCRIPTION OF THE DRAWING

The invention is illustrated diagrammatically by a single FIGURE which shows one possible apparatus for carrying out the invention.

In the practice of the invention, primary sludge from a sewage plant is pumped up to system pressure (around 400 psig) by pump 10 then through heat exchanger 1 and heater 2 where it is heated to around 450° F and thence to coke drum 3 where coke 12 settles to the bottom. Grease 14 rises to the top and is skimmed off through valve 13. Gas is taken off through line 6 and recombined with coker effluent removed through line 7. Air is injected to the coker effluent in line 16 through inlet 18 to burn out remaining chemical oxygen demand (COD) of the effluent, and finally the oxidized coker effluent is passed through heat exchanger 1 in heat exchange with fresh feed. Wet coke slurry 12 is pumped through line 20 after addition through inlet 22 of $Na_2CO_3$ in water as catalyst, to the reactor 4 where it reacts with hot synthesis gas introduced through line 29. The oil produced and water and gas pass from the top of vessel 4 through line 24 and the oil and water are condensed and then separated in separator 5. A portion of the gas is vented through line 26 and the remainder recycled through line 28 to reactor 4. Water and oil are removed from the separator through outlet 30. Solids are removed from the bottom of vessel 4 through trap 32 and may be reacted in known manner to produce synthesis gas and a residue which is useful as a fertilizer and soil conditioner.

In an example of the successful practice of the process, there were coked in liquid phase at 450° F and 400 psig 2700 grams of sewage sludge from the primary settler of the Beacon, New York sewage plant. The yields from the coking operation were as follows:

| | |
|---|---|
| Gas: 2.6 g. (0.09 wt. %) | Composition (Mol. %) |
| | Butylenes 0.2 |
| | Propylene 0.9 |
| | $H_2S$ 0.3 |
| | $H_2$ 0.4 |
| | $CO_2$ 98.2 |
| Grease: 5.4 g. (0.2 wt. %) | 72% carbon |
| Coke Slurry: 205 g. (7.5 wt. %) | on a dry basis represents 54 g. (2.0 wt. % charge) |
| | Dry Coke Analysis |
| | 41.6 wt. % carbon |
| | 6.1 wt. % hydrogen |
| | 31.1 wt. % ash |
| Liquid Effluent from Coker (92.2 wt. %) | |

The charge to the coker had a COD of 60,000 mg. $O_2$/liter and the effluent from coker had 14,179 mg. $O_2$/liter COD for a COD reduction at 76.4%.

It can be seen from the above that the COD of the raw sewage had been reduced by 76.4% with the COD reduction being accounted for by the gas, grease and coke slurry produced.

The coke clurry, representing 7.6 weight percent of the sewage sludge, was transferred to an autoclave and pressured with 650 psig of CO and then run at 575° F for 2 hours. A pressure of 2900 psig was developed. The autoclave was opened and the viscous liquid was removed with the aid of benzene and extracted in an extractor with benzene to yield 18.5 grams of oil (after removal of benzene) and 11.3 grams of solids (dry, benzene-free).

| | Wt. % Carbon | Wt. % Hydrogen | Wt. % Nitrogen | Wt. % Sulfur | Wt. % Ash | Gross Heat of Combustion BTU/lb. |
|---|---|---|---|---|---|---|
| Oil Analysis | 74.4 | 10.7 | 2.1 | 0.22 | — | 16,296 |
| Solid Analysis | 16.4 | 1.8 | 0.6 | 0.64 | 75.2[a] | 3,018 |

[a]Ash Analysis from Solid
 3.1% phosphorus
 39.1% silica
 0.41% potassium

There were 54 grams of solids available for the CO-water reaction, or, by analysis, 22.4 grams of carbon available for the reaction.

61.5% of the carbon was converted to low sulfur oil. 8.3% of the carbon remained in the solids.

The above data shows that by concentrating the sewage solids, reactor volume of vessel 4 is reduced by about 90% over that required if the raw sewage alone were treated. Also, the amount of water in reactor 4 is kept to a minimum so that the heat load and the energy requirements are reduced.

While the present invention has been exemplified by reference to the treatment of sewage sludge, the same is not limited to such material but, rather, can be applied to the treatment of various reactive sludges and slurries which contain cellulose, starches and related carbohydrates.

Various catalytic agents are suitable for improving the conversion step of the process. Such agents include $NaHCO_3$, $K_2CO_3$ and $KHCO_3$.

What is claimed is:

1. A process for making low sulfur oil from an aqueous charge containing cellulose and other carbohydrates comprising coking said charge at a temperature in the range of 400° to 550° F under a pressure of 300 to 1200 psig for 5 minutes to 2 hours to form an aqueous slurry containing cokes solids; removing from 50 to 99 percent of the liquid from said slurry; contacting the thus concentrated slurry with hot pressurized synthesis gas at a pressure of between about 500 to 5000 psig at a temperature of between 500° to 750° F to form a low sulfur oil, gases and carbon and inorganic solids and separating said oil from said carbon and inorganic solids and gases.

2. The process of claim 1 wherein said charge consists of sewage sludge.

3. The process of claim 1 wherein a catalytic agent of the group of $Na_2CO_3$, $NaHCO_3$, $K_2CO_3$ and $KHCO_3$ is added to said concentrated slurry.

* * * * *